United States Patent [19]

Kuhlmann

[11] 4,273,074

[45] Jun. 16, 1981

[54] COOLING DEVICE FOR HOT GASES IN PIPES

[75] Inventor: Herbert Kuhlmann, Bochum, Fed. Rep. of Germany

[73] Assignee: Sidepal Societe Anonyme Société Industrielle de Participations Luxembourgeois, Luxembourg, Luxembourg

[21] Appl. No.: 59,625

[22] Filed: Jul. 23, 1979

[30] Foreign Application Priority Data

Jul. 24, 1978 [LU]  Luxembourg ............................ 80033

[51] Int. Cl.³ ................................................ F22D 1/00
[52] U.S. Cl. .................................. 122/7 R; 122/20 B; 122/421; 165/163
[58] Field of Search ............. 122/20 B, 136 R, 136 C, 122/137, 138, 140 R, 140 A, 153, 421, 7 R; 165/163

[56] References Cited

U.S. PATENT DOCUMENTS

| | | | |
|---|---|---|---|
| 1,015,145 | 1/1912 | Davis | 122/20 B |
| 1,148,832 | 8/1915 | Edison | 122/7 R |
| 1,674,442 | 6/1928 | McNulty | 122/421 |
| 1,752,673 | 4/1930 | Ladd | 122/7 R |
| 2,143,287 | 1/1939 | Smith | 122/20 B |
| 3,991,823 | 11/1976 | Litke et al. | 165/163 |
| 4,188,916 | 2/1980 | Csathy et al. | 122/7 R |

Primary Examiner—Henry C. Yuen
Attorney, Agent, or Firm—McGlew and Tuttle

[57] ABSTRACT

A cooling device for use in tubular hot gas conduits which are made up of a plurality of longitudinally arranged side by side abutting pipes includes a plurality of registers arranged in spaced relationship along the length of the pipe and extending into the pipe from one side thereof into closely spaced arrangement in respect to the opposite side. The registers each include a plurality of U-shaped pipes which are interconnected and arranged in the direction of flow and which are connected externally of the hot gas conduit through respective inlet and outlet headers.

8 Claims, 2 Drawing Figures

COOLING DEVICE FOR HOT GASES IN PIPES

BACKGROUND OF THE INVENTION

Field of the Invention

The invention relates in general to heat exchangers and in particular to a new and useful cooling device for hot gases in pipes, particularly for hot waste gases from industrial furnaces.

Although the cooling device to which the invention relates can in principle be used in any gas pipe in which hot gases are to be cooled, it will be described hereinafter by reference to the concrete example of its use in industrial furnace waste pipes fitted with a fresh-air intake. Waste gas or gas suction removal pipes of this kind, with a fresh-air intake, whether or not the latter can be regulated, are already known, for example, from electric arc furnaces for the electrical production of steel.

With these furnaces, for reasons explained in detail, for example, in Luxemburg Patent Application No. 80034 of July 24th, 1978, an adjustable intake for additional air or fresh air is preferably provided, downstream of a throttle device, in the gas suction pipe. One purpose of this air intake is to ensure afterburning of the hot waste gases from the furnaces and also to cool the gases.

The cooling of the gases is assisted by a usually water-cooled piece of piping for waste gas, preferably designed on the "pipe-to-pipe" principle, connected up at the point where the intake for additional air is provided in the piping system and hereinafter briefly termed "connection pipe" or "connection piece".

This water-cooled connection pipe, in order to keep the cost moderate and ensure that it does not occupy excessive space, should not be allowed to exceed a certain length, approximately 15 m, but over this length of the connecting pipe, it is desired to cool the gases down by at least 400°.

For reasons of energy economy, the proportion of the cooling effect provided by the water-cooled connection pipe by comparison with the part of the cooling action exerted by the additional air should be as great as possible, since not only does the heating undergone by the cooling water represent recoverable energy but a high proportion of fresh air would entail the direct loss of this otherwise recoverable energy, besides which, still more efficient exhauster fans would be required. The practical conclusion to be drawn from these circumstances is that the supply of fresh air should be kept to the indispensable minimum and the hot waste gases brought into as intimate contact as possible with cooling elements which, if necessary, enable energy to be recovered in a usable form. It will be evident from the foregoing that the cooling pipes of the connection pipe constitute cooling elements of this kind.

The fresh air, at a relatively low temperature, is nevertheless fed in at that point on the periphery of the waste gas pipe at which the gases enter the connection pipe. In the latter, therefore, a kind of "funnel" occurs, i.e. a peripheral layer of low temperature fresh air containing a hot "core" of gas. This flow configuration suffers from the dual drawback that the air and gas are only incompletely mixed together, disproportionately large quantities of air therefore being required for the after-burning of the gas, and that the hot gases, contrary to the purpose in view are kept away by the tubular "funnel" of air from the pipe walls to be cooled.

Even if no hose-shaped funnel formed, however, perhaps because suitable measures had been taken to effect the intensive mixing of incoming fresh and of hot gases, it would still not be possible to ensure optimum contact between the entire volume of the mixture on its comparatively short passage through the connection pipe.

SUMMARY OF THE INVENTION

The purpose of the invention is to provide a cooling device which will largely eliminate the drawbacks and inadequacies of existing systems, by considerably intensifying, with simple means, the cooling effect exerted on the waste gases passing through a certain section of the waste gas piping and by rendering recoverable the energy dissipated in this process.

This purpose is achieved by means of a cooling device characterized by cooling registers forming part of a vapor or liquid cooled "pipe-to-pipe" construction and installed so that they extend into the waste-pipe transversally to the direction of flow of the waste gases.

Accordingly, it is an object of the invention to provide a cooling device for use in a tubular hot gas conduit which is made up of longitudinally arranged pipes disposed in side by side abutting relationship around the conduit circumference, a plurality of registers connected into one of the pipes and disposed in space relationship along the length of the conduit. Each register extends transverse to the flow direction through the conduit and they are connected into a respective one of the pipes forming the conduit walls. Each register includes one or more substantially U-shaped pipes which are connected externally of the conduit to an inlet for the flow of cooling fluid from one side of the conduit to the other and then backwardly to an outlet.

A further object of the invention is to provide a cooling device for use in hot gas conduits which are made up of walls having a plurality of side by side pipes disposed around the periphery of the conduit and which includes one or more registers connected into the pipe walls, each of which includes a pipe arrangement in the form of a flow from an inlet header to an outlet header in which the cooling fluid flows through one or more paths from one side of conduit to the other.

A further object of the invention is to provide a cooling arrangement for connection into a wall of a conduit formed by a multiplicity of pipes arranged in side by side abutting relationship and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
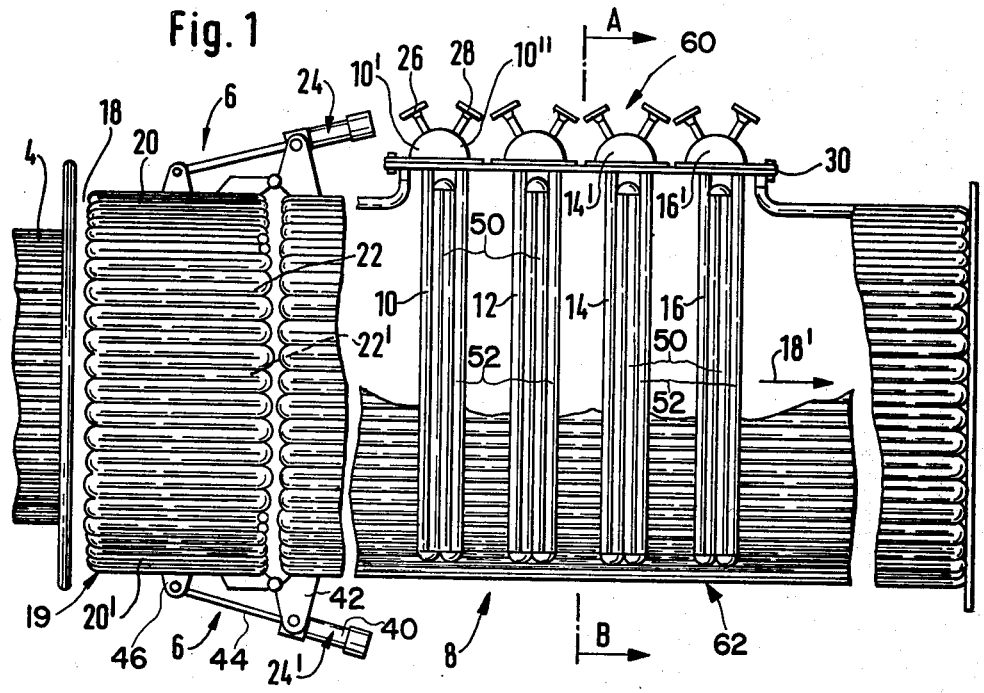
FIG. 1 is a front elevational view of a partly broken away section of waste-gas piping, with cooling registers extending into it constructed in accordance with the invention.

Referring to the drawings in particular, the invention embodied therein, comprises, a cooling device generally designated 60 for use in a tubular hot gas conduit, generally designated 62. The tubular hot gas conduit 62 includes a damper portion 19 which is adjustable in respect to the pipe end or connection piece 4 in a connection pipe 8. The hot gas conduit 62 is of a type having an open end, mounted in a spaced relationship relative thereto, to define an air gap 18 which may be adjusted relative to the pipe end 4. The air gap 18 size may be varied for the inflow of cooling air into the hot gas line and for the supply of air for additional combustion of the hot gases as they flow through the hot gas pipe 62. Cooling device 60 in accordance with the invention comprises a plurality of registers 10, 12, 14 and 16 which are arranged in space relationship in respect to the direction of flow indicated by the arrow 18' and they extend from one side of the hot gas conduit 62 into closely spaced relationship with the opposite side.

FIG. 1 shows a section of waste-gas piping belonging, for instance, to an electric arc furnace and consisting of a pipe end 4, which may, for example, be the downstream end of the elbow of the furnace, and of a regulator 6 for additional air, in accordance with Luxembourg patent application No. 80034, and also a vapor-or-water-cooled connection pipe 8, constructed on the "pipe-to-pipe" principle, into which cooling registers 10, 12, 14 and 16 are built, these latter taking the form of a likewise vapor-or-liquid-cooled pipe-to-pipe construction and being built into the connection pipe in succession to one another as viewed in the direction of flow 18' of the gases and positioned perpendicularly to the flow direction. An air gap 18 ensures the constant supply of a certain minimum quantity of additional air from the surrounding areas.

The additional air flow through air gap 18 can be advantageously controlled by the regulating device 6 in accordance with the aforementioned Luxemburg patent application. In this process, the tube part, generally designated 19, includes segmental dampers 20, 22, 20', 22', of which, for the sake of simplicity, only two are shown, i.e. 24 and 24', are either opened or closed with a "tulip-type" movement. The dampers 24 and 24' each include a piston provided in control cylinders 40 attached to brackets 42 on connection pipe 8. The pistons have rods 44 which are pivotally connected to brackets 46 on respective segments of tube part 19.

As may be easily seen from FIG. 1, the cold air flowing in at 18 will inevitably cause a colder marginal layer to form along the inner wall of the pipe 8, as a result of which the desired cooling of the hot waste gases will be at all events seriously impeded if special counter-measures are not adopted.

Figure 2:
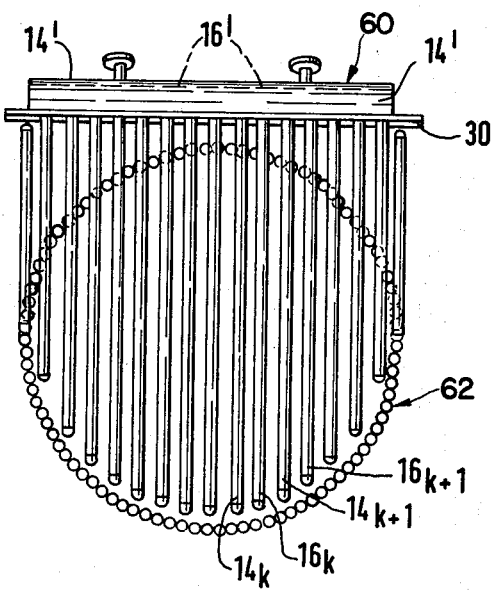
FIG. 2 is a section taken along the line A–B of FIG. 1.

According to the invention, cooling registers generally designated 10, 12, 14 and 16 are disposed across connection pipe 8 and are located at spaced locations along the length of the connection pipe. Each register is in the form of a vapor-cooled, or preferably water-cooled "pipe-to-pipe" construction. Each of these cooling registers possesses an inlet 26 and an outlet 28, between which the cooling water circulates between connected U-shaped tubes 50 and 52 up and down a number of times on the serpentine principle (FIG. 1). In the case of each register, e.g. the register 10, certain numbers of these serpentines are connected in parallel to one common inlet water tank portion or header 10' and one common outlet water tank portion or header. This parallel arrangement of individual serpentines may also be seen in FIG. 2. The serpentines of two registers succeeding each other, as viewed in the direction of flow of the gases, as shown by arrow 18' are preferably laterally offset in respect to each other relative to the flow direction 10', as may be seen from the references $14_k$, $16_k$, $14_{k+1}$ and $16_{k+1}$ of individual serpentines selected from the registers 14 and 16. This staggered arrangement ensures the best possible contact between the hot waste gases and the cooling pipes of the registers.

In addition to the direct cooling action on the gases flowing through the system the invention also ensures a certain turbulent motion in the said gases, thus improving not only the contact with the cooling pipes of the cooling registers themselves but also the contact with the wall of the cooled connection pipe 8, as the hose-shaped "funnel" of cold air coming in from gap 18 as mentioned previously is destroyed by turbulence.

As may be seen from the drawings, the registers are inserted into the connection pipe 8 individually, preferably from the top, and are affixed to one common baseplate 30. The operation of dismantling the registers for maintenance or repair, or in order to remove deposits of dust from the connection pipe 8, thus presents no difficulty. The registers are preferably constructed as modules, and the number of these installed can vary according to the cooling requirements. Upon the removal of a register, the opening can be closed with a blind cover of the size of the baseplate 30.

While specific embodiments of the invention have been shown and described in detail to illustrate the application of the principles of the invention, it will be understood that the invention may be embodied otherwise without departing from such principles.

What is claimed is:

1. A cooling device for use in a tubular hot gas conduit of the type having longitudinal pipes arranged in side-by-side abutting relationship around the conduit circumference, said conduit having a gas flow path extending therethrough in a longitudinal direction, said conduit having an open end adopted to be mounted in spaced relationship from a hot gas supply for receiving a hot gas and defining an air gap for the flow of air into the gas flow path, and damper means for adjusting the spacing between the open end and the hot gas supply relative to the hot gas supply thereby controlling the flow of air through the air gap, comprising, in combination therewith, a plurality of registers arranged in spaced relationship along the length of said conduit and extending across said conduit transverse to the flow path, each of said registers including a plurality of tubes connected into one side of said hot gas conduit and extending through said hot gas conduit substantially to the other side thereof, each of said tubes having an inflow portion extending into said hot gas conduit from one side for passing a flow of a medium to the opposite side of said conduit and an outflow portion connected to said inflow portion for passing a flow from said opposite side to the one side for the outflow of the cooling medium.

2. A cooling device according to claim 1, wherein successive longitudinally spaced registers are laterally offset with respect to each other relative to the flow path.

3. A cooling device according to claim 2, wherein said tubes comprise a plurality of substantially U-shaped tube elements having a leg portion extending from one side of the hot gas conduit to the other, a leg portion extending from the other side back to the first side, and said legs being interconnected so as to define a serpentine flow path for a cooling medium.

4. A cooling device according to claim 3, including inlet and outlet headers connected to respective opposite ends of said tubes for the inflow of a cooling medium and the outflow of a cooling medium.

5. A cooling device according to claim 4, wherein said registeres each include combined inlet and outlet header, a mounting plate closing one side of said hot gas conduit, each of said heads being mounted in spaced relationship on said mounting plate, said tube comprising a passage defining a back and forth flow path through said hot gas conduit and said tube being connected at respective ends of said inlet and outlet headers.

6. A cooling device according to claim 1, wherein each of said registers include a common water inlet tank and a common water outlet tank connected to respective ends of said tubes.

7. A cooling device according to claim 1, wherein each of said registers include a serpentine tube forming a flow space extending backwardly and forwardly through said conduit, the longitudinally spaced ones of said registers having serpentine tubes which are offset with respect to each other.

8. A cooling device according to claim 1, including a common baseplate mounting all of said registeres on said hot gas conduit.

* * * * *